(12) United States Patent
Tong

(10) Patent No.: US 12,326,215 B2
(45) Date of Patent: Jun. 10, 2025

(54) TABLET STAND

(71) Applicant: Shenzhen Zhenting Trading Co., Ltd., Shenzhen (CN)

(72) Inventor: Li Tong, Shenzhen (CN)

(73) Assignee: Shenzhen Zhenting Trading Co., Ltd., Shenzhen (CN)

( * ) Notice: Subject to any disclaimer, the term of this patent is extended or adjusted under 35 U.S.C. 154(b) by 0 days.

(21) Appl. No.: 19/019,038

(22) Filed: Jan. 13, 2025

(65) Prior Publication Data

US 2025/0146616 A1  May 8, 2025

(30) Foreign Application Priority Data

Jan. 4, 2025  (CN) .......................... 202520019967.8

(51) Int. Cl.
| | |
|---|---|
| *F16M 11/12* | (2006.01) |
| *F16M 11/04* | (2006.01) |
| *H02J 7/00* | (2006.01) |
| *H04M 1/06* | (2006.01) |

(52) U.S. Cl.
CPC ......... *F16M 11/121* (2013.01); *F16M 11/041* (2013.01); *F16M 2200/066* (2013.01); *H02J 7/0042* (2013.01); *H04M 1/06* (2013.01)

(58) Field of Classification Search
None
See application file for complete search history.

(56) References Cited

U.S. PATENT DOCUMENTS

| | | | | |
|---|---|---|---|---|
| 9,890,899 | B2* | 2/2018 | Theis | F16M 13/02 |
| 10,801,662 | B2* | 10/2020 | Lebedev | A47B 23/02 |
| 10,948,946 | B2* | 3/2021 | Borloz | F16M 11/38 |
| 11,285,064 | B2* | 3/2022 | Fouts | F16M 11/2042 |
| 11,287,083 | B2* | 3/2022 | Lim | F16M 11/08 |
| 11,530,774 | B2* | 12/2022 | Borloz | F16M 11/105 |
| 11,836,020 | B2* | 12/2023 | Saravis | G06F 1/1632 |
| 12,018,793 | B2* | 6/2024 | Tu | F16M 11/10 |
| 2011/0147546 | A1* | 6/2011 | Monsalve | F16M 11/2014 |
| | | | | 248/122.1 |
| 2015/0129724 | A1* | 5/2015 | Kohmoto | F16M 13/00 |
| | | | | 248/316.4 |
| 2016/0309010 | A1* | 10/2016 | Carnevali | G06F 1/1628 |

\* cited by examiner

*Primary Examiner* — Xanthia C Relford
(74) *Attorney, Agent, or Firm* — Murray, Ziel & Johnston; Aaron Powell

(57) ABSTRACT

A tablet stand includes a bottom base, a supporting assembly and a cantilever. The bottom base and the supporting assembly are connected through the cantilever, and the angle of the cantilever is adjustable. A charging device is arranged on the supporting assembly. Thus, putting a tablet on the said tablet stand, then the tablet is recharged. Since the charging device is provided on the supporting assembly, the tablet is recharged without interference even if users move the stand or adjust an angle of the stand.

10 Claims, 5 Drawing Sheets

TABLET STAND

PRIORITY CLAIM AND CROSS-REFERENCE TO RELATED APPLICATION

The present invention claims the benefit of Chinese Patent Application No. 2025200199678 filed on Jan. 4, 2025, the contents of which are hereby incorporated by reference.

TECHNICAL FIELD

The present invention belongs to the technical field of stands, and particularly relates to a tablet stand.

BACKGROUND

Tablet stands are practical accessories designed specifically for tablets to improve the comfort and convenience of using tablets in various environments and occasions. The angles of the popular tablet stands on the market usually are adjustable, which allow users to adjust the inclination of the tablet according to personal preferences and needs. Such a design helps reduce the tension on the neck and shoulder muscles caused by using a tablet in a fixed posture for a long time, thereby reducing the risk of physical discomfort.

However, given the limited battery life of tablets, users often need to recharge tablets during use. When the tablet is connected to the charging cable, adjusting the angle of the stand or moving the stand may interfere with the charging cable, resulting in poor contact of the charging cable and the tablet. This situation may force users to frequently reconnect the charging cable, which may damage not only the charging cable but also the tablet's charging port in the long run.

SUMMARY

In order to overcome the defects of the existing technology, the present invention provides a tablet stand, which is provided with a charging device and can be connected to an external power supply. Thus, putting a tablet on the said tablet stand, then the tablet is recharged. Since the charging device is provided on the supporting assembly, the tablet is recharged without interference even if users move the stand or adjust an angle of the stand.

The technical scheme adopted by the present invention for solving the technical problems is as follows:

A tablet stand includes a bottom base, a supporting assembly and a cantilever. The bottom base and the supporting assembly are connected through the cantilever. The angle of the cantilever is adjustable, and a charging device is arranged on the supporting assembly.

Further, the charging device includes charging contacts and a circuit board. The charging contacts are exposed on a surface of the supporting assembly. The circuit board is arranged inside the supporting assembly. The supporting assembly is provided with a charging port, which is electrically connected to the circuit board.

Further, a plurality of magnets are arranged inside the supporting assembly.

Further, the bottom base includes a first connection plate and a second connection plate. The first connection plate and the second connection plate are both configured as an L shape structure. One end of the first connection plate is connected to a bottom side of the cantilever, and other end of the first connection plate is connected to one end of the second connection plate. The second connection plate and the first connection plate form a C shape plate, which is provided with an adjustment component at one end away from the cantilever. The adjustment component can move in a vertical direction relative to the C shape plate.

Further, the adjustment component includes a bolt and a butt plate. The bolt is threadedly connected to a bottom end of the C shape plate, and the butt plate is connected to a top end of the bolt.

Further, the cantilever is provided with a threading hole protruding on its surface.

Further, a rotary column is arranged on a surface of the bottom base. The cantilever includes a first adjustment arm, a bearing and a connection piece. The bearing is arranged between the connection piece and the first adjustment arm. The rotary column passes through the connection piece and then is inserted into the interior of the bearing and is tightly fitted with an inner ring of the bearing, and an outer ring of the bearing is fixedly connected to the first adjustment arm.

Further, the cantilever also includes a second adjustment arm. One end of the second adjustment arm is movably connected to the supporting assembly, and other end of the second adjustment arm is movably connected to the first adjustment arm.

Further, a fixed plate is connected to a bottom side of the supporting assembly. A connection ring is arranged on the fixed plate. A U shape structure is arranged at one end of the second adjustment arm close to the supporting assembly. Two ends of the U shape structure are connected by a rotating shaft, and the connection ring is sleeved outside the rotating shaft.

Further, the second adjustment arm is hinged to the first adjustment arm. A sliding shaft is arranged at one end of the first adjustment arm close to the second adjustment arm. A pneumatic rod is arranged inside the second adjustment arm. One end of the pneumatic rod is sleeved on the sliding shaft, and other end of the pneumatic cylinder is fixed to a top side of the second adjustment arm.

The beneficial effects of the present invention:

The present invention provides a tablet stand, which is provided with a charging device and can be connected to an external power supply. Thus, putting a tablet on the said tablet stand, then the tablet is recharged. Since the charging device is provided on the supporting assembly, the tablet is recharged without interference even if users move the stand or adjust an angle of the stand.

Description of marks in figures:
  1—bottom base; 11—C shape plate; 111—first connection plate; 1111—connection hole; 112—second connection plate; 113—adjustment component; 1131—bolt; 1132—butt plate; 114—rotary column;

2—supporting assembly; 21—cooling unit; 22—circuit board; 221—charging contact; 222—charging port; 23—magnet; 24—fixed plate; 25—connection ring; 26—camera window;

3—cantilever; 30—connection piece; 31—threading hole; 32—first adjustment arm; 33—bearing; 34—sliding shaft; 35—second adjustment arm; 351—U shape structure; 352—rotating shaft; 353—pneumatic rod.

DETAILED DESCRIPTION

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

The present invention provides a tablet stand, which is provided with a charging device and can be connected to an external power supply. Thus, putting a tablet on the said tablet stand, then the tablet is recharged. Since the charging device is provided on the supporting assembly, the tablet is recharged without interference even if users move the stand or adjust an angle of the stand.

Figure 1:
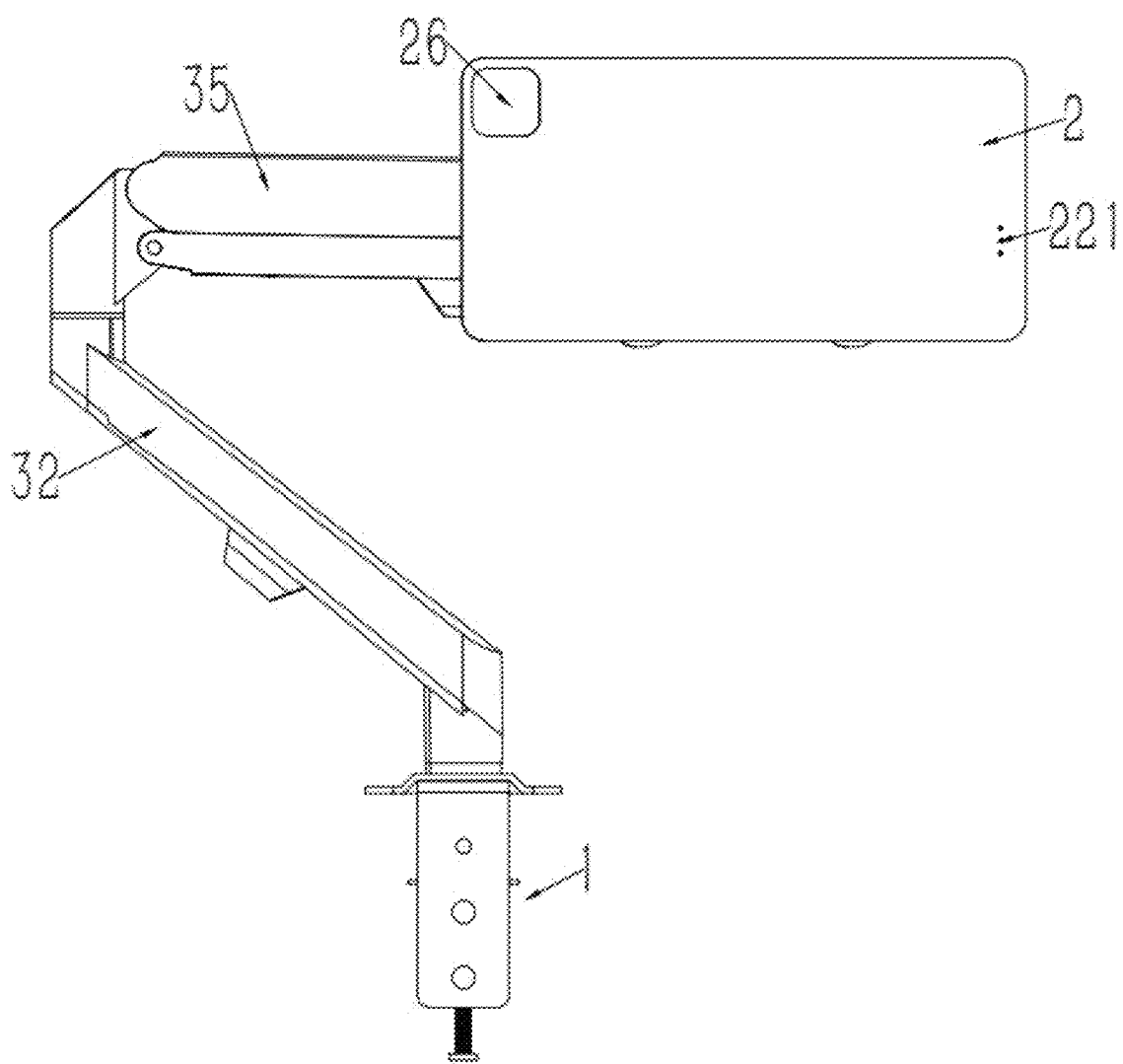
FIG. 1 is a schematic view (front view) of a tablet stand of the present invention.
Figure 2:
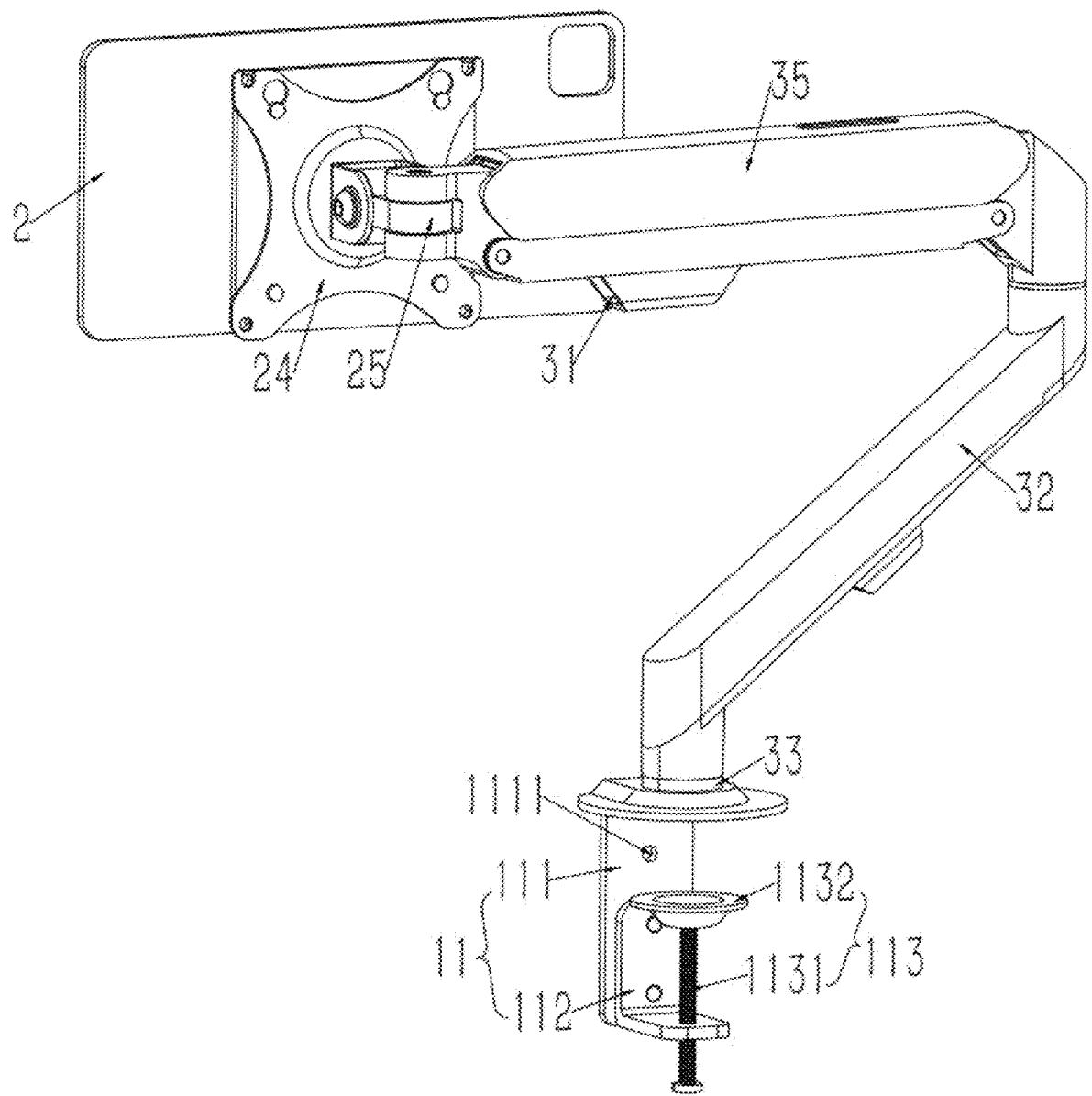
FIG. 2 is a schematic view of the tablet stand of the present invention from another angle.
Figure 3:
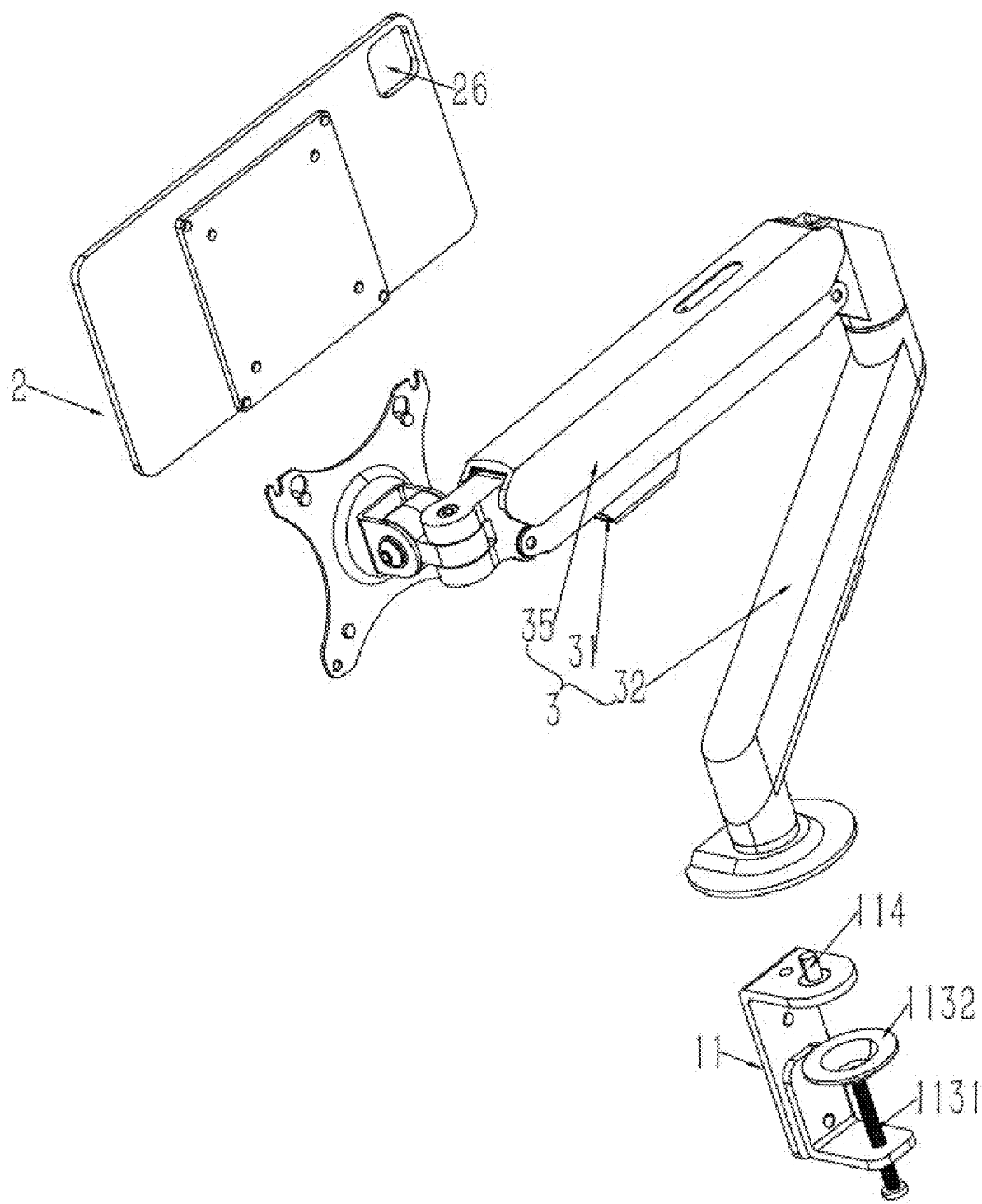
FIG. 3 is an exploded view of the tablet stand of the present invention.
Figure 4:
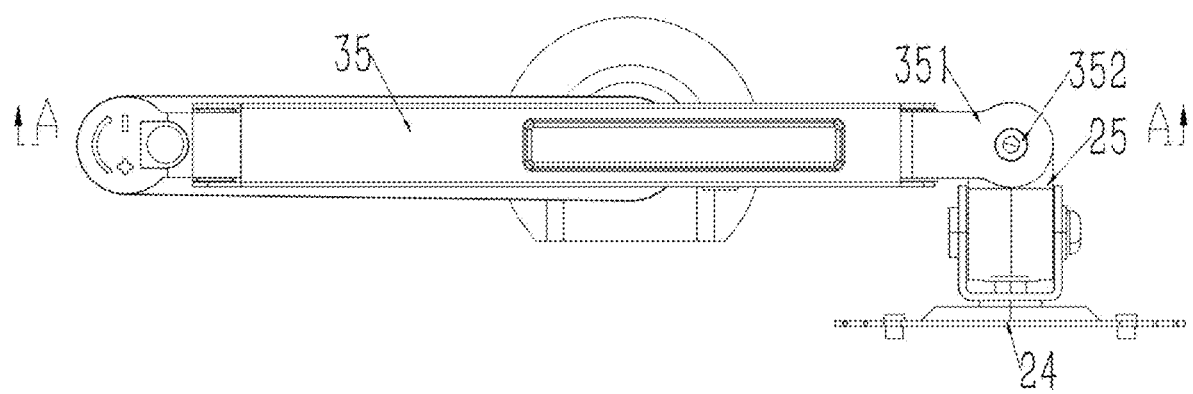
FIG. 4 is a schematic view (top view) of the tablet stand of the present invention.
Figure 5:
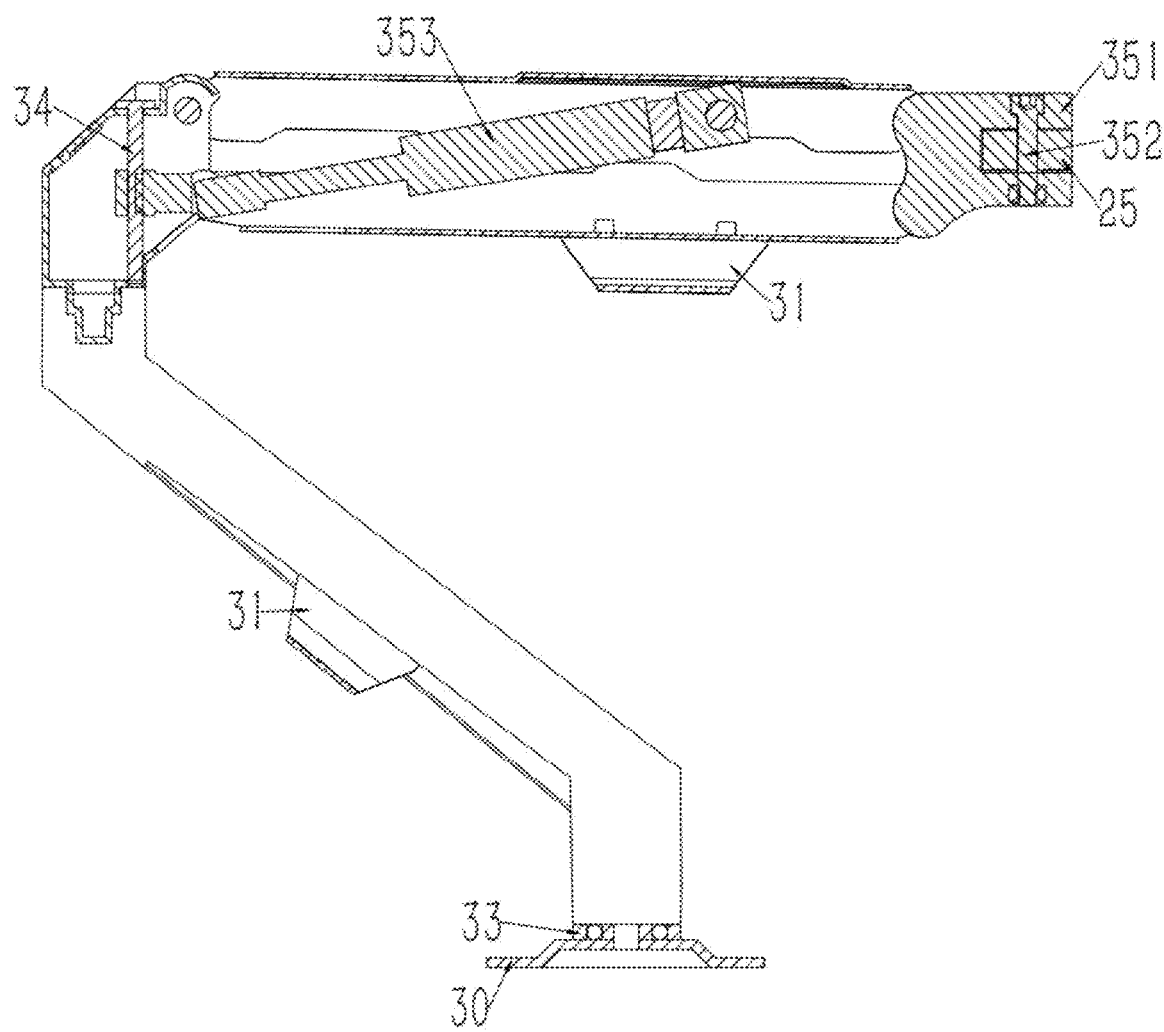
FIG. 5 is a cross-sectional view along the line A-A in FIG. 4.
Figure 6:
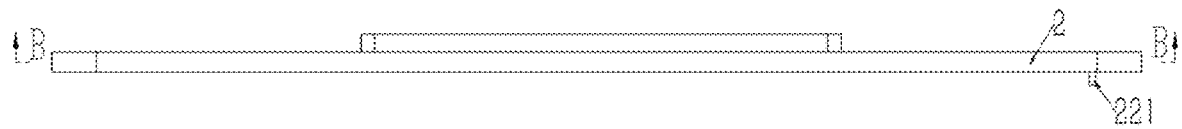
FIG. 6 is a schematic view of the supporting assembly of the present invention.
Figure 7:
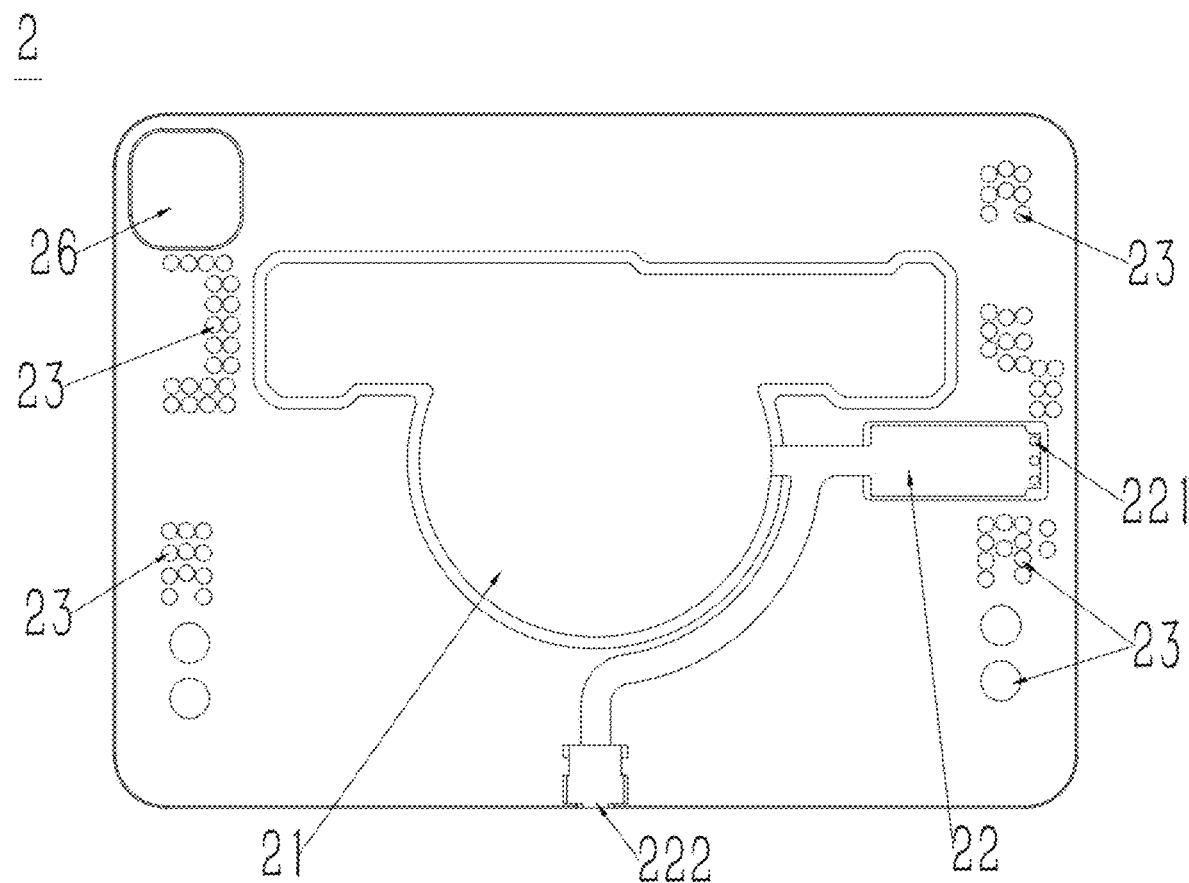
FIG. 7 is a cross-sectional view along the line B-B in FIG. 6.

Referring to FIGS. 1-7, this embodiment provides a tablet stand, including a bottom base 1, a supporting assembly 2 and a cantilever 3. The bottom base 1 and the supporting assembly 2 are connected through the cantilever 3. The angle of the cantilever 3 is adjustable, and a charging device is arranged on the supporting assembly 2.

In one embodiment, the charging device includes charging contacts 221 exposed on the surface of the supporting assembly 2 and a circuit board 22 arranged inside the supporting assembly 2. The supporting assembly 2 is provided with a charging port 222, and the charging port 222 is electrically connected to the circuit board 22.

The external power supply and the charging port 222 can be connected through a charging cable to provide an operation voltage for the circuit board 22. The circuit board 22 provides an operation voltage for the charging contacts 221. The tablet is placed on the supporting assembly 2 and the contacts on the tablet are aligned and contacted with the charging contacts 221, so that the tablet can be recharged.

In another embodiment, the charging device includes a wireless charging transmitter coil, which cooperates with the wireless charging receiver coil inside the tablet. The tablet can be recharged by putting the tablet on the supporting assembly 2 at will without alignment.

In one embodiment, a plurality of magnets 23 are arranged inside the supporting assembly 2. The magnets 23 can be attached to the back of the tablet, so that the tablet can be stably placed on the supporting assembly 2.

In another embodiment, a baffle can be arranged at a bottom side of the supporting assembly 2. When the tablet is placed on the supporting assembly 2 and the supporting assembly 2 is adjusted to an inclined state, the baffle will support the bottom of the tablet to prevent the tablet from sliding off the supporting assembly 2.

In one embodiment, a cooling unit 21 is arranged inside the supporting assembly 2. When the tablet is put on the supporting assembly 2, the cooling unit 21 can help the tablet dissipate heat to prevent the tablet from being overheated and affecting its use. Preferably, the cooling unit 21 is made of aluminum alloy.

In one embodiment, the bottom base 1 includes a first connection plate 111 and a second connection plate 112. The first connection plate 111 and the second connection plate 112 are both configured as an L shape structure. One end of the first connection plate 111 is connected to the bottom of the cantilever 3, and other end of the first connection plate 111 is connected to one end of the second connection plate 112. The second connection plate 112 and the first connection plate 111 form a C shape plate 11. An adjustment component 113 is arranged at one end of the C shape plate 11 away from the cantilever 3. The adjustment component 113 can move in a vertical direction relative to the C shape plate 11.

According to the attached drawings, it can be understood that the adjustment component 113 is connected to a bottom end of the C shape plate 11, the cantilever 3 is connected to a top end of the C shape plate 11. The adjustment component 113 is threadedly connected to the bottom end of the C shape plate 11 and the height is adjustable. The space between the top end of the C shape plate 11 and a top end of the adjustment component 113 forms a fixed area. The external object is clamped into the fixed area by inserting the external object into the fixed area and threadedly rotating the adjustment component 113 to adjust the height.

The external object referred to here may be an object with a certain thickness, such as a table, a shelf or a bed board. The bottom base 1 can be clamped and connected with the external object to fix the tablet stand to the external object.

Further, a plurality of connection holes 1111 are vertically distributed on the first connection plate 111, and the second connection plate 112 is connected to two of the connection holes 1111 through screws. Understandably, the second connection plate 112 can be connected to different connection holes 1111, and together with the first connection plate 111, form C shape plates 11 of different sizes, and then combined with an adjustment plate which can threadedly adjust height, so that the bottom base 1 can be connected to external objects of different sizes, and has a wider range of applications.

In one embodiment, the supporting assembly 113 includes a bolt 1131 and a butt plate 1132. The bolt 1131 is threadedly connected to the second connection plate 112, and the butt plate 1132 is connected to the bottom end of the C shape plate 11. When the bottom base 1 is connected to an external object, the butt plate 1132 will touch the bottom of the external object. Compared with the bolt 1131 directly contacting the bottom of the external object, the butt plate 1132 can generate a larger contact area with the external object and disperse the pressure of the contact surface, thereby avoiding scratching or damaging the surface of the external object and ensuring the stability of the connection.

In one embodiment, the cantilever 3 is provided with a threading hole 31 protruding on its surface. The threading hole 31 is used for the charging cable to pass through, so as to guide the charging cable, so that the charging cable and the cantilever 3 are in a relatively fixed state. When users adjust the position and angle of the cantilever 3, the charging cable will not be interfered with, thereby preventing the charging cable from being entangled with the cantilever 3.

In one embodiment, a rotary column 114 is arranged on the surface of the bottom base 1. The cantilever 3 includes a first adjustment arm 32, a bearing 33 and a connection piece 30. The bearing 33 is arranged between the connection piece 30 and the first adjustment arm 32. The rotary column 114 penetrates the connection piece 30 and then is inserted into an inner ring of the bearing 33 and is tightly fitted with the inner ring of the bearing 33. The outer ring of the bearing 33 is fixedly connected to the first adjustment arm 32. The first adjustment arm 32 can rotate relative to the bottom base 1 to adjust the horizontal angle of the tablet stand.

Preferably, the connection piece 30 is fixedly connected to the first connection plate 111 by screws.

In one embodiment, the cantilever 3 also includes a second adjustment arm 35. One end of the second adjustment arm 35 is movably connected to the supporting assembly 2, and other end of the second adjustment arm 35 is movably connected to the first adjustment arm 32.

Specifically, the bottom side of the supporting assembly 2 is connected to a fixed plate 24, on which a connection ring 25 is arranged. A U shape structure 351 is arranged at one end of the second adjustment arm 35 close to the supporting assembly 2. Two ends of the U shape structure 351 are connected by a rotating shaft 352, and the connection ring 25 is sleeved on an outside of the rotating shaft 352, so that the supporting assembly 2 can rotate relative to the second adjustment arm 35.

In one embodiment, the second adjustment arm 35 is hinged to the first adjustment arm 32. A sliding shaft 34 is arranged at one end of the first adjustment arm 32 close to the second adjustment arm 35. A pneumatic rod 353 is arranged inside the second adjustment arm 35, one end of the pneumatic rod is sleeved on the sliding shaft 34, and other end of the pneumatic rod 353 is fixed to a top side of the second adjustment arm 35. By providing the pneumatic rod 353 inside the second adjustment arm 35, users can apply external force to the second adjustment arm 35 to adjust its angle, and the pneumatic rod 353 can be used to keep the second adjustment arm 35 at any angle to meet users' needs for use at different angles.

In one embodiment, the supporting assembly 2 is also provided with a camera window 26. When the tablet is put on the supporting assembly 2, the camera of the tablet will be exposed on the back of the supporting assembly 2 through the camera window 26, and users can perform activities such as shooting and video recording normally.

In combination with the above description, it can be seen that the supporting assembly 2 in the tablet stand provided in this embodiment can be adsorbed and connected to the tablet, and the tablet can be recharged through a charging cable. The cantilever 3 in the tablet stand can be adjusted in the horizontal and vertical directions to meet the users' needs for use at different angles.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

What is claimed is:

1. A tablet stand, comprises a bottom base, a supporting assembly and a cantilever, wherein the bottom base and the supporting assembly are connected through the cantilever; the angle of the cantilever is adjustable, and a charging device is arranged on the supporting assembly, and the charging device comprises charging contacts and a circuit board; the charging contacts are exposed on a surface of the supporting assembly; the circuit board is arranged inside the supporting assembly; and the supporting assembly is provided with a charging port, which is electrically connected to the circuit board.

2. The tablet stand according to claim 1, wherein a plurality of magnets are arranged inside the supporting assembly.

3. The tablet stand according to claim 1, wherein the bottom base comprises a first connection plate and a second connection plate; the first connection plate and the second connection plate are both configured as an L shape structure; one end of the first connection plate is connected to a bottom side of the cantilever, and other end of the first connection plate is connected to one end of the second connection plate; the second connection plate and the first connection plate form a C shape plate, which is provided with an adjustment component at one end away from the cantilever; and the adjustment component moves in a vertical direction relative to the C shape plate.

4. The tablet stand according to claim 3, wherein the adjustment component comprises a bolt and a butt plate; the bolt is threadedly connected to a bottom end of the C shape plate, and the butt plate is connected to a top end of the bolt.

5. The tablet stand according to claim 1, wherein the cantilever is provided with a threading hole protruding on its surface.

6. The tablet stand according to claim 1, wherein a rotary column is arranged on a surface of the bottom base; the cantilever comprises a first adjustment arm, a bearing and a connection piece; the bearing is arranged between the connection piece and the first adjustment arm; the rotary column passes through the connection piece and then is inserted into interior of the bearing and is tightly fitted with an inner ring of the bearing, and an outer ring of the bearing is fixedly connected to the first adjustment arm.

7. The tablet stand according to claim 6, wherein the cantilever also comprises a second adjustment arm; one end of the second adjustment arm is movably connected to the supporting assembly, and other end of the second adjustment arm is movably connected to the first adjustment arm.

8. The tablet stand according to claim 7, wherein a fixed plate is connected to a bottom side of the supporting assembly; a connection ring is arranged on the fixed plate; a U shape structure is arranged at one end of the second adjustment arm close to the supporting assembly; two ends of the U shape structure are connected by a rotating shaft, and the connection ring is sleeved outside the rotating shaft.

9. The tablet stand according to claim 7, wherein the second adjustment arm is hinged to the first adjustment arm; a sliding shaft is arranged at one end of the first adjustment arm close to the second adjustment arm; a pneumatic rod is arranged inside the second adjustment arm; one end of the pneumatic rod is sleeved on the sliding shaft, and other end of the pneumatic rod is fixed to a top side of the second adjustment arm.

10. A tablet stand, comprises a bottom base, a supporting assembly and a cantilever, wherein the bottom base and the supporting assembly are connected through the cantilever; the angle of the cantilever is adjustable, and a charging device is arranged on the supporting assembly; and a rotary column is arranged on a surface of the bottom base, wherein the cantilever comprises a first adjustment arm, a bearing and a connection piece; the bearing is arranged between the connection piece and the first adjustment arm; and the rotary column passes through the connection piece and is inserted into an interior of the bearing and is tightly fitted with an inner ring of the bearing, and an outer ring of the bearing is fixedly connected to the first adjustment arm.

\* \* \* \* \*